Figure 3:
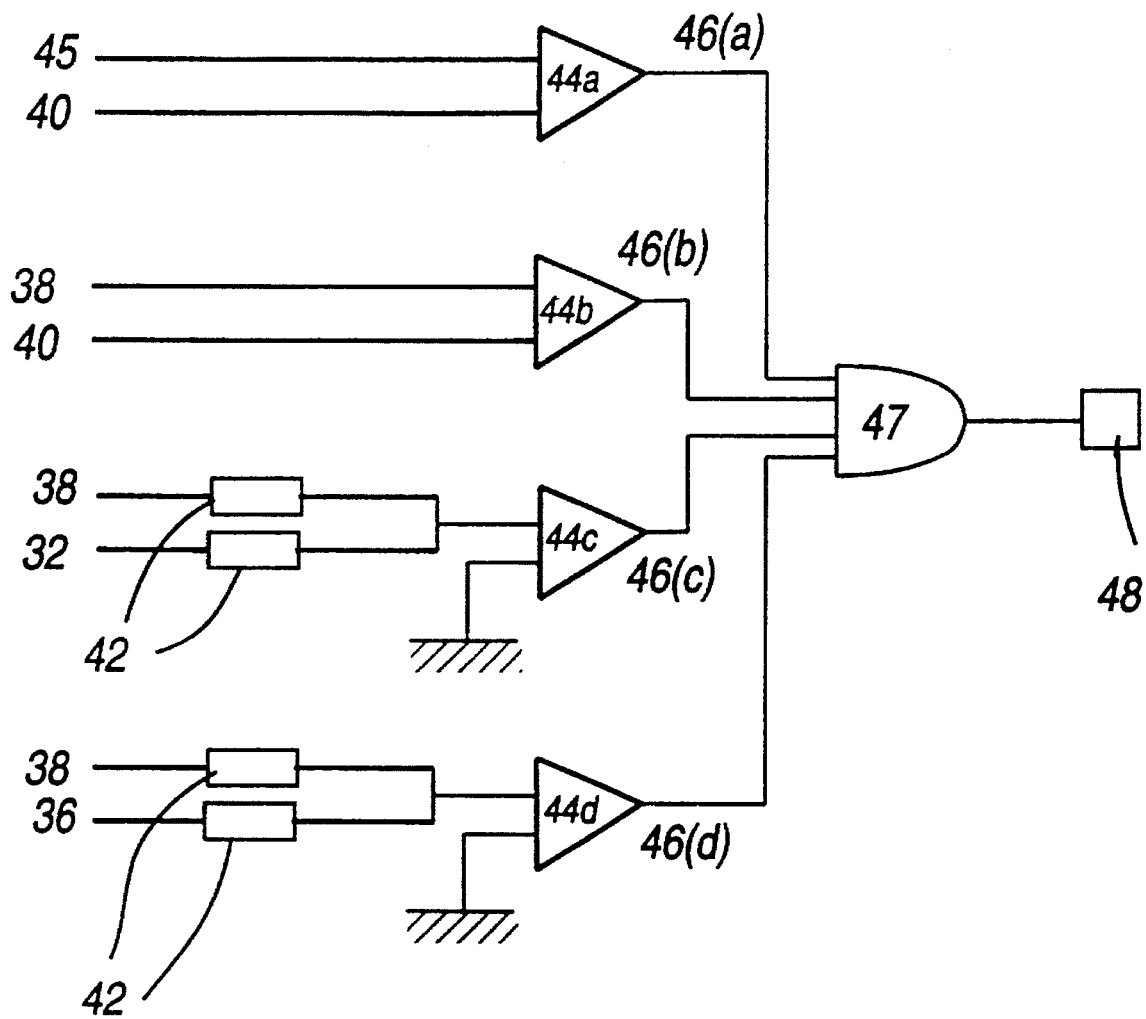

United States Patent [19]

Green et al.

[11] Patent Number: 5,612,528
[45] Date of Patent: Mar. 18, 1997

[54] PROCESSING OF MAGNETICALLY RECORDED DATA TO DETECT FRAUD

[75] Inventors: Ian M. Green, London; Simon N. M. Willcock, High Wycombe, both of England

[73] Assignee: Central Research Laboratories Limited, Middlesex, England

[21] Appl. No.: 374,609

[22] PCT Filed: Jul. 27, 1992

[86] PCT No.: PCT/GB93/01581

§ 371 Date: Mar. 1, 1995

§ 102(e) Date: Mar. 1, 1995

[87] PCT Pub. No.: WO94/02943

PCT Pub. Date: Feb. 3, 1994

[30] Foreign Application Priority Data

Jul. 27, 1992 [GB] United Kingdom .................. 9215924

[51] Int. Cl.[6] ..................................................... G06K 7/08
[52] U.S. Cl. ............................................ 235/449; 360/67
[58] Field of Search ................................... 235/449, 462; 360/67

[56] References Cited

U.S. PATENT DOCUMENTS

| 4,328,519 | 5/1982 | Way ........................... 360/67 |
| 4,399,474 | 8/1983 | Coleman, Jr. ............... 360/67 |
| 4,593,184 | 6/1986 | Bryce et al. ................ 235/449 |
| 4,617,458 | 10/1986 | Bryce ......................... 235/449 |
| 4,749,087 | 6/1988 | Buttifant ..................... 209/534 |
| 5,068,519 | 11/1991 | Bryce ......................... 235/449 |

FOREIGN PATENT DOCUMENTS 2035659  6/1980  United Kingdom .

*Primary Examiner*—Donald T. Hajec
*Assistant Examiner*—Mark Tremblay
*Attorney, Agent, or Firm*—Keck, Mahin & Cate

[57] ABSTRACT

A coil (6) forming part of a tuned circuit (8) is wound around a gapped magnetic core (2). As a magnetic stripe (14) is passed under core (2), variations to the amplitude and frequency of the circuit (8) occur dependent upon the magnetic data on the strip (14). Selected data are manipulated to derive several values (32, 36, 38, and 40) for combination via AND-gate (47). Only if the combination value is above a threshold value is an indication given that the stripe (14) is genuine and not an attempted copy.

8 Claims, 4 Drawing Sheets

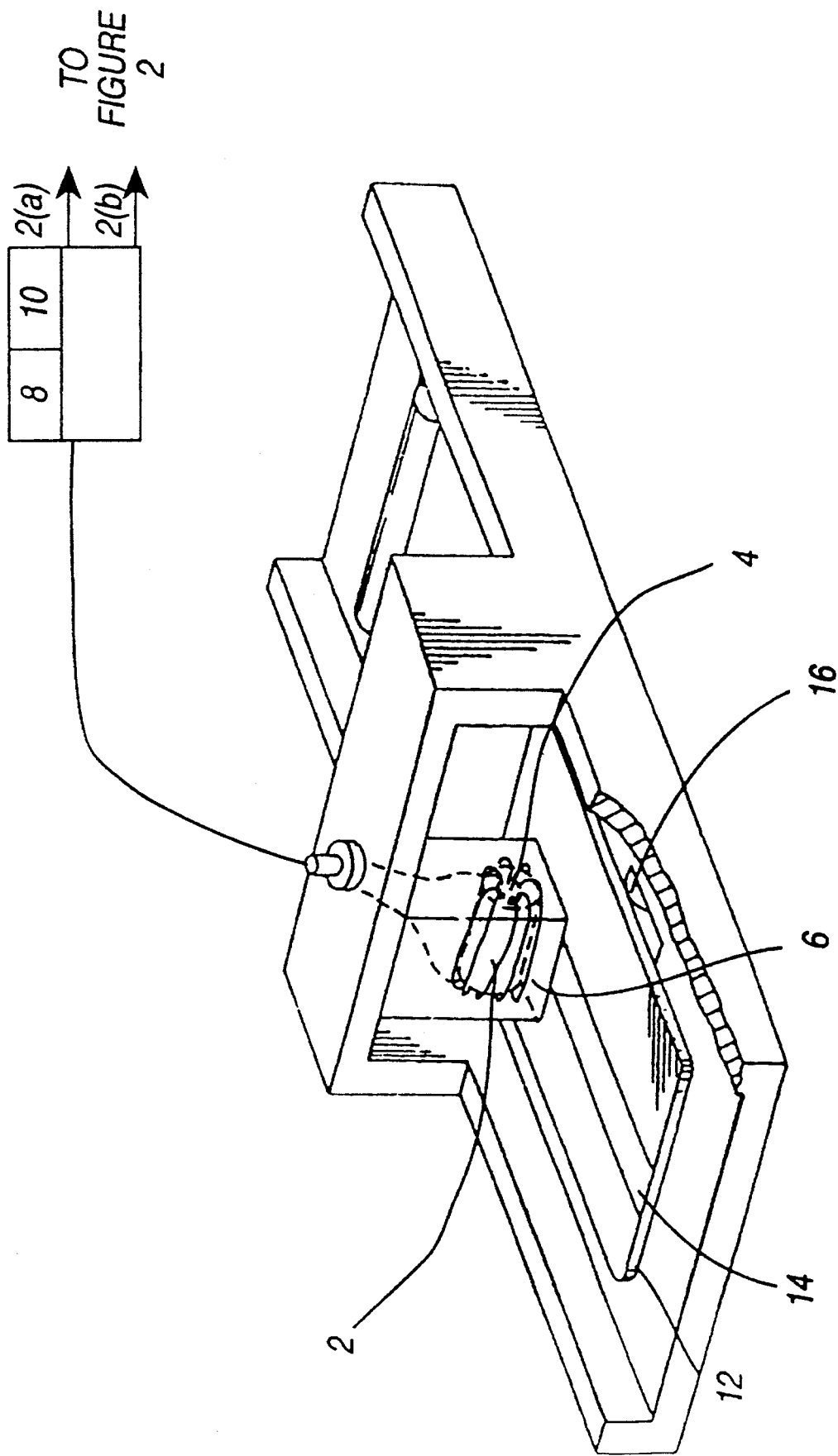

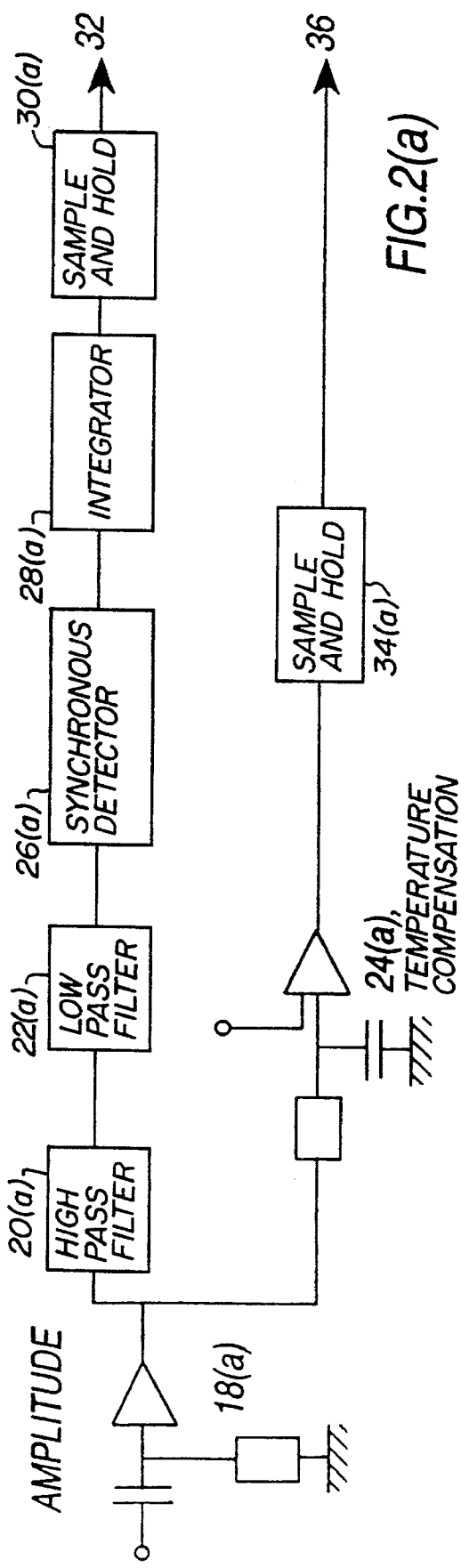
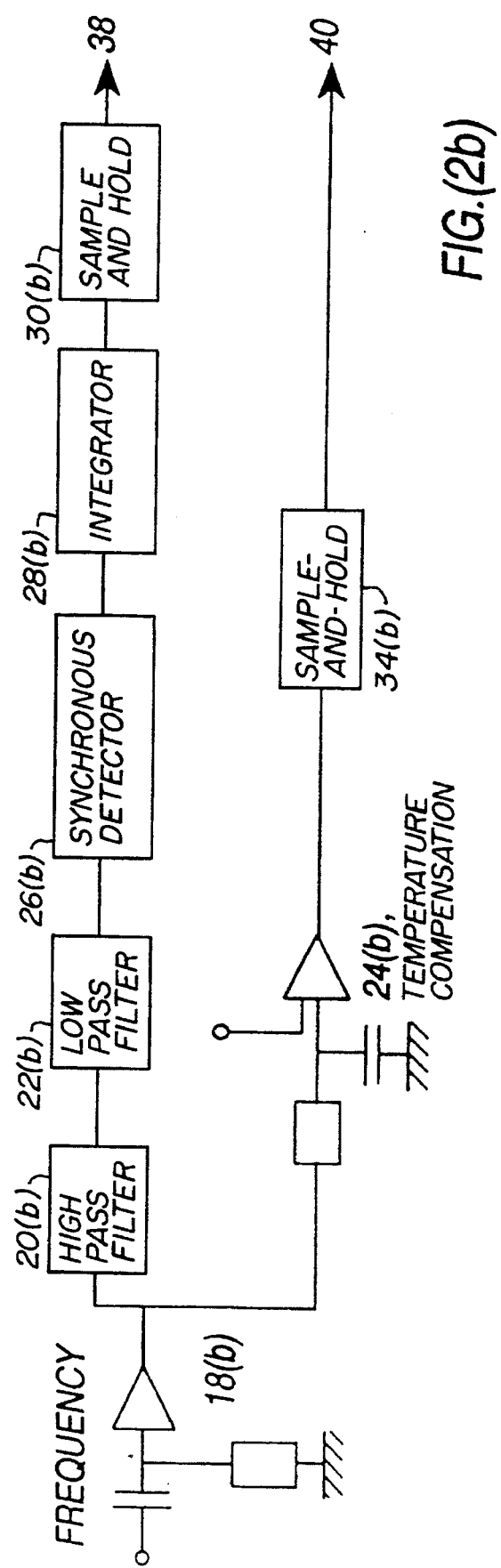
FIG. 2(a)
FIG. (2b)

PROCESSING OF MAGNETICALLY RECORDED DATA TO DETECT FRAUD

The present invention relates to a method of, and apparatus for, reading magnetically encoded information, the apparatus comprising:

a gapped magnetic core;

a coil wound upon the core and forming part of a tuned circuit;

an oscillator for driving the tuned circuit at a frequency lying on its resonance curve;

means for providing a first signal dependant upon the amplitude of signals occuring within the tuned circuit; and verification means for verifying the genuineness of the magnetically encoded information, which verification means comprises means for providing a second signal dependant upon the frequency of signals occurring within the tuned circuit.

Substrates bearing magnetically encoded information are increasingly being used, for example, in point-of-sale or automated transaction applications.

A known apparatus of the above general kind is described in our published UK patent number GB 2,035,659. In this apparatus the gapped core and associated coil are held just above and pass over a magnetic stripe. The magnetic stripe comprises alternate sections of permanently aligned ferrous oxide particles interspersed with sections of either differently aligned or randomly oriented ferrous oxide particles. The changes in magnetic permeability of the stripe in the different sections as the core passes over it induce variations in the frequency of the resonant circuit. A signal dependent on this frequency is used to determine whether the stripe under examination is genuine or not.

Whilst the known apparatus operates in an entirely satisfactory manner, a system which offers improved discrimination performance over the prior art is an attractive proposition because of the more widespread use of substrates bearing such magnetically encoded information.

According to one aspect of the present invention an apparatus as defined in the first paragraph is characterized in that in that the verification means further comprises:

means for deriving from the first and second signals a plurality of output values representative of signal amplitude and frequency variations occurring within the circuit upon relative movement between the coil and the magnetically encoded information;

means for comparing at least one of the output values representative of signal amplitude variations and at least one of the output values representative of signal frequency variations, or functions thereof, with either other output values or known reference values, thereby to obtain a plurality of test values derived from the comparison; and means for combining the test values to provide a combination value, such that a positive indication of genuine magnetically encoded information is obtained in dependence upon the combination value having a defined relationship with a predetermined threshold value.

Hence by provision of several test values, all of which must possess certain minimum or maximum requirements, a potentially more secure discrimination system as between genuine and attempted copies of magnetically encoded information than has hitherto been available is provided.

The present invention, in another aspect, provides a method of reading magnetically encoded information including: passing the magnetically encoded information by a gapped magnetic core which has a coil wound thereupon, the coil forming part of a tuned circuit driven at the resonant frequency by an oscillator; and providing a first signal dependent upon the amplitude of signals occurring within the tuned circuit and a second signal dependent upon the frequency of signals occurring within the tuned circuit; characterized by deriving from the first and second signals a plurality of output values representative of signal amplitude and frequency variations produced within the circuit by the passing; comparing at least one of the output values representative of signal amplitude variations and at least one of the output values representative of signal frequency variations, or functions thereof, with either other output values or known reference values, thereby obtaining a plurality of test values; and, combining the test values to provide a combination value, such that a positive indication of genuine magnetically encoded information is obtained in dependence upon the combination value having a defined relationship with a predetermined threshold value.

Figure 4A:
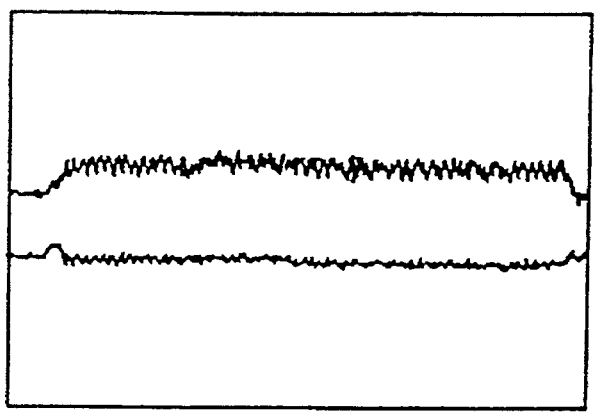
Figure 4B:
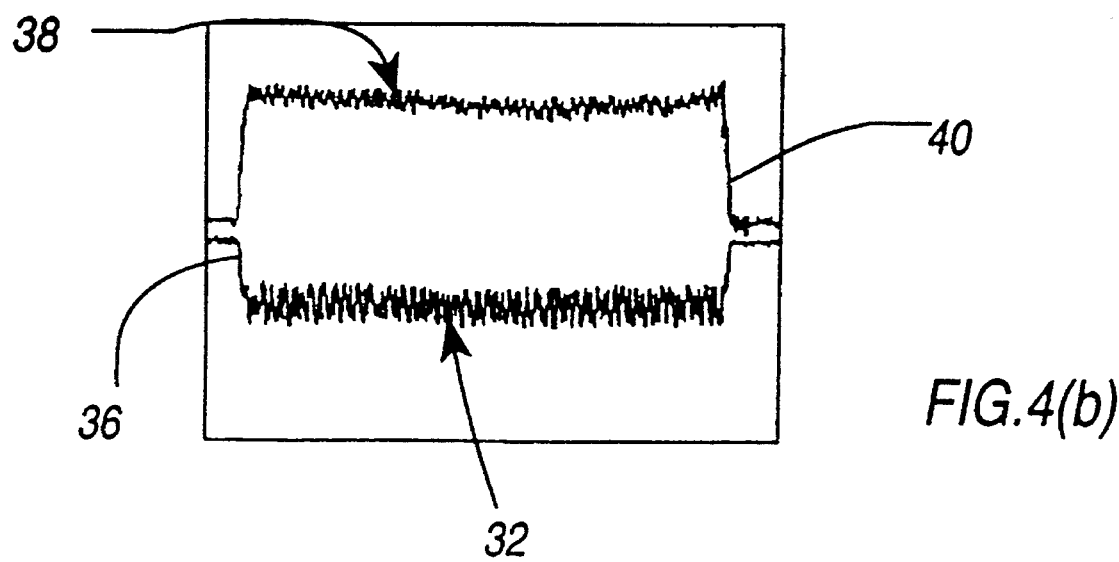

The present invention will now be described, by way of example only, with reference to the accompanying drawings, of which;

FIG. 1 shows a representation of a known reader of magnetically encoded information;

FIGS. 2(a) and 2(b) illustrate schematically part of an embodiment of the present invention;

FIG. 3 illustrates schematically a comparison means employed in the present invention; and, FIGS. 4(a) and 4(b) illustrate graphically the difference detected by an embodiment of the present invention between genuine and attempted copies of magnetically encoded data.

Referring firstly to FIG. 1, a known reader of magnetically encoded information comprises a gapped magnetic core such as ferrite member 2 which has gap 4 therein. The ferrite member 2 has a coil 6 wound thereupon, the coil 6 forming part of a tuned circuit 8. The tuned circuit 8 is driven at its resonant frequency by an oscillator 10.

A card 12 bearing magnetically encoded information, in this example a permanently structured magnetised stripe 14 is introduced to the reader by roller drivers 16 (only one shown) such that the stripe 14 passes below and adjacent to the core 2. The gap 4 of the core 2 is aligned so that the flux lines across it generated by the tuned circuit 8 lie in a known orientation direction to the direction of the stripe 14.

The resonant frequency of the circuit 8 is chosen to be around 30 khz and as the stripe 14 passes by the core 2, the amplitude and resonant frequency of the circuit 8 vary because of the changes in magnetic loss and permeability due to the structured regions of stripe 14 influencing the circuit 8.

It is known that the frequency variations may be used as parameters for determining whether the card 12 in question is in fact genuine or an attempted copy. For example, such frequency variations are used to determine whether or not the stripe 14 is valid and is achieved by determining the occurrence of significant changes in the signal frequency fluctuations.

Referring now also to FIG. 2, it will be seen that the signal amplitude and frequency variations are used as inputs to buffer and filter components in FIGS. 2(a) and 2(b) respectively.

It will be appreciated that because the circuit components in FIGS. 2(a) and 2(b) operate on their signal inputs in similar fashions, then reference will only be made to one, 2(a), yet the reference thereto also applies to the operations performed on signal 2(b).

The buffer and filter components 18(a) receive the signal amplitude variations from the circuit 8. From here, the signal is then split into two portions, an upper portion and a lower portion as seen in FIG. 2(a).

The upper portion, as shown in FIG. 2(a), passes via high-pass 20(a) and lowpass 22(a) filters to remove any unwanted noise. The timred signal is then sent to synchronous detector 26(a) in order to rectify the signal amplitude variations in a known manner. The rectified signal then passes on to an integrator 28(a) to provide amplitude values of the signal amplitude variations. Then a sample-and-hold component 30(a) provides output values 32 indicative of the amplitude levels of the signal amplitude variations received by filter and buffer components 18(a) from the circuit 8. This upper portion of the signal amplitude variations is obtained when the stripe 14 of the card 12 is moved relative to the gap 4 of the core 2, and always being either in contact therewith or spaced by an invariable distance therefrom.

The lower portion of the signal amplitude variations is derived from the relative difference between the amplitude signal when the stripe 14 of card 12 is adjacent the gap 4 of the core 12 and when the stripe 14 is away from the gap 4 so that no magnetic effects are observed. In this lower portion, as shown in the lower split of FIG. 2(a) after the buffer and filter components 18(a), the signal passes via a low-pass filter and temperature compensation arrangement 24(a) and on to a further sample-and-hold component 34(a). This then provides an output signal 36 indicative of the change in amplitude signal as described above.

Thus signal 32 is indicative of signal amplitude modulations as the stripe 14 passes relative to the gap 4, yet signal 36 is indicative of the change in amplitude signal variations when the strip 14 is adjacent the gap 4 relative to any signal produced at the gap 4 when the stripe 14 is not present.

It will be understood that the signal frequency variations in FIG. 2(b) provide frequency modulation values 38 and frequency change values 40 in the same manner as described above.

The four output values 32, 36, 38, and 40 are then passed, in the parallel arrangement shown in FIG. 3, to a means for comparing the output values, in this example resistors 42 and comparators 44.

The comparator 44(a) receives both the output value 40 and known reference voltage 45. The comparator 44(a) will provide a test value output based upon its two inputs. This test value will be high if the output value 40 exceeds the value of the reference voltage 45 and low if not.

Comparator 44(b) operates in a similar manner to that of comparator 44(a), however a test value output which is high is only produced if output value 40 is greater than output value 38.

Comparator 44(c) will produce a high test value if the output value 38 coupled with a value dependent upon its associated resistor 42 and added to the output value 32 is greater than the zero potential value of the other comparator 44(c) input.

Comparator 44(d) operates in a similar fashion to comparator 44(c), except that the two relevant output values under consideration are 38 and 36.

Thus the resultant outputs of all comparators 44 are four test values 46(a)–(d), each of which is either high or low depending upon the inputs to these comparators.

A means for combining these four test values 46(a)–(d), in this example AND-gate 47 receives each such value and provides therefrom a combination value 48. In dependence upon this combination value 48 exceeding a present threshold value, then an output from the AND-gate 47 provides a positive indication of genuine magnetically encoded information. In the current example, if any one of the test values is low, then no such indication is given and the card 12 and stripe 14 are rejected.

Such acceptance/rejection is not an issue germane to the patentability of the present invention and so will not be further described herein, although understanding of such is assumed.

FIGS. 4 illustrate the traces seen by comparing a genuine FIG. 4(b), with an attempted copy FIG. 4(a), of stripe 14. The four signal amplitude and frequency modulation and change values, 32, 36, 38, 40 respectively are shown in FIGS. 4. The difference between the genuine and attempted copies stripes 14 is thus clearly visible.

Those skilled in the art will appreciate that, whilst in the above example an AND gate 47 exemplifies the means for combining the test values, any suitable combination means may be used so long as a predetermined relationship exists between the combination value and the threshold value. For example, a predetermined threshold may be set such that all test values input to the means for combining must be low for a positive output to result, or all test values must be within certain threshold windows.

It will be apparent that whilst only four test values have been illustrated in the above example, any number of test values and any suitable derivation may be employed. For example, the means for comparing the output values need not simply analyse the output values, per se. Functions or values derived therefrom may also yield useful comparison results for providing test values. Examples of such are the square or square root of an output value; the division of one output value, or combination of several, by another or others of the output values.

It will be appreciated by those skilled in the art, and particularly with reference to FIGS. 4 that parity, that is the polarity of the signals and derived values, is important. if, for example, the polarity of the changes 40, 36 were not in the correct sense, then positive discrimination would not occur. Hence, parity is a further discriminatory feature of the present invention.

It will be apparent that other criteria may be employed to provide additional verification parameters to those described hereabove. For example, visual identification means or hidden ultra-violet reflective codes which may only be seen when illuminated with ultra-violet light may also be placed on the card 12 adjacent or on top of the stripe 14.

Those skilled in the art will realise that modifications to the above may be made whilst still remaining within the scope of the invention. For example, the temperature compensator included in components 24(a) and (b) may not be required for putting the invention into effect.

It will be apparent also that the concepts of the above invention are equally applicable to the so-called "swipe reader". In such a reader the card 12 is swiped past the gap 4 of core 2 under manual control without the need for drive rollers 16.

We claim:

1. Apparatus for reading magnetically encoded information (14) comprising:

a gapped magnetic core (2);

a coil (6) wound upon the core (2) and forming part of a tuned circuit (8);

an oscillator (10) for driving the tuned circuit (8) at a frequency lying on its resonance curve;

means for providing a first signal dependant upon the amplitude of signals occurring within the tuned circuit; and verification means (18, 20, 22, 24, 26, 28, 30, 34, 42, 44, 47) for verifying the genuineness of the magnetically encoded information, which verification means comprises means for providing a second signal dependant upon the frequency of signals occurring within the tuned circuit, characterized in that the verification means further comprises:

means (18, 20, 22, 24, 26, 28, 30, 34) for deriving from the first and second signals a plurality of output values (32, 36, 38, 40) representative of signal amplitude and frequency variations occurring within the circuit (8) upon relative movement between the coil (6) and the magnetically encoded information (14);

means (44) for comparing at least one of the output values (32,36) representative of signal amplitude variations and at least one of the output values (38, 40) representative of signal frequency variations, or functions thereof, with a value from a group comprising the said other output values and functions thereof and known reference values, thereby to obtain a plurality of test values (46) derived from the comparison; and means (47) for combining the test values (46) to provide a combination value (48), such that a positive indication of genuine magnetically encoded information is obtained in dependence upon the combination value (48) having a defined relationship with a predetermined threshold value.

2. Apparatus according to claim 1 wherein the signal amplitude and frequency variations comprise: offsets from respective amplitude and frequency reference values; and amplitude and frequency modulations about the offset amplitude and frequency values.

3. Apparatus according to claim 2 wherein the means for deriving a plurality of output values includes first and second pairs of circuits, the first circuit of the first pair having its input coupled to the output of the means for providing a first signal, and the second circuit of the first pair having its input coupled to the output of the means for providing a second signal, each circuit of the first pair including a band-pass filter, a rectifier, an integrator and a sample-and-hold component beinq connected in series, the first circuit of the second pair having its input coupled to the means for providing a first signal and the second circuit of the second pair having its input coupled to the means for providing a second signal, each circuit of the second pair including a low-pass filter and a sample-and-hold component being connected in series.

4. Apparatus according to claim 1 wherein the means for comparing the output values comprises a plurality of comparators arranged to receive predetermined permutations of the different output values and provide therefore, from each comparator, a single test value.

5. Apparatus according to claim 4 wherein the predetermined permutations of the different output values comprise either permutations of the output values themselves, or permutations of functions thereof or mathematically derived therefrom.

6. Apparatus according to claim 1 wherein the means for combining the test values comprises an AND-gate.

7. Apparatus according to claim 1 wherein the defined relationship is that the combination value is greater than the predetermined threshold value to indicate a positive genuine, magnetically encoded information.

8. A method of reading magnetically encoded information (14) comprising: passing the magnetically encoded information (14) by a gapped magnetic core (2) which has a coil (6) wound thereupon, the coil (6) forming part of a tuned circuit (8) driven at the resonant frequency by an oscillator (10); providing a first signal dependent upon the amplitude of signals occurring within the tuned circuit and a second signal dependent upon the frequency of signals occurring within the tuned circuit; deriving from the first and second signals a plurality of output values (32, 36, 38, 40) representative of signal amplitude and frequency variations produced within the circuit (8) by the passing; comparing at least one of the output values (32, 36) representative of signal amplitude variations and at least one of the output values (38, 40) representative of signal frequency variations, or functions thereof, with, a value from a group comprising said other output values and functions thereof and known reference values, thereby obtaining a plurality of test values (46); and combining the test values (46) to provide a combination value (48), such that a positive indication of genuine magnetically encoded information is obtained in dependence upon the combination value (48) having a defined relationship with a predetermined threshold value.

* * * * *